INVENTOR
HUGH BROUGHAM SEDGFIELD

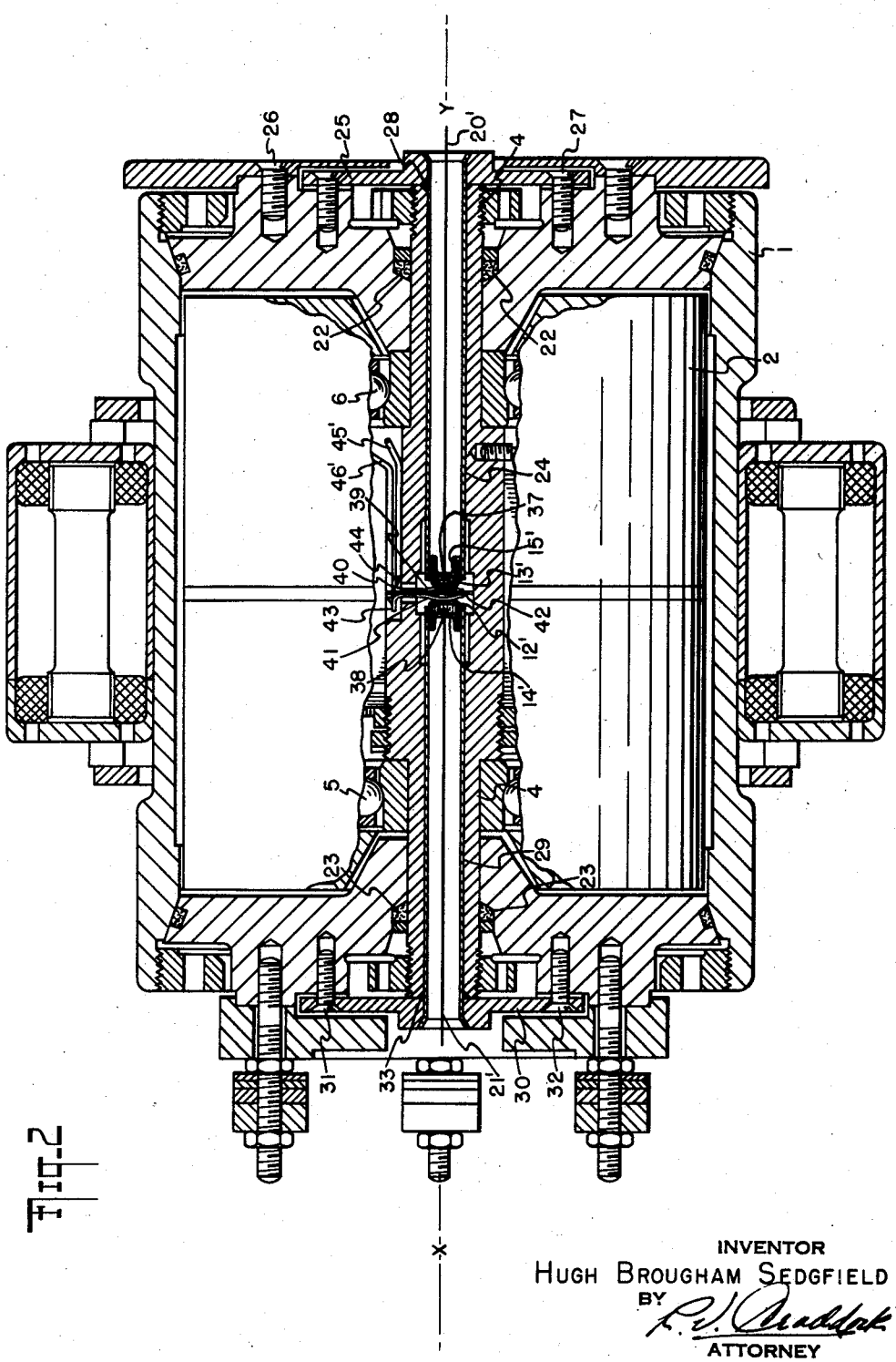

July 12, 1960
H. B. SEDGFIELD
2,944,425
GYROSCOPIC APPARATUS
Filed Dec. 19, 1956
3 Sheets-Sheet 3
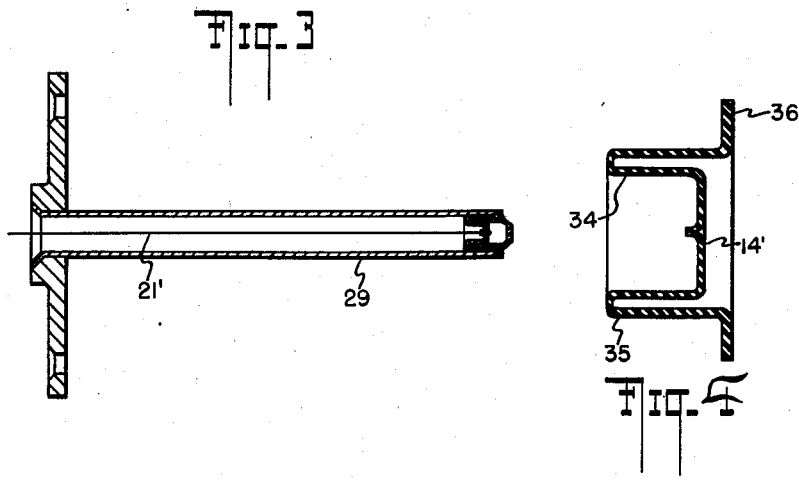
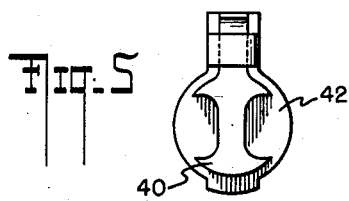
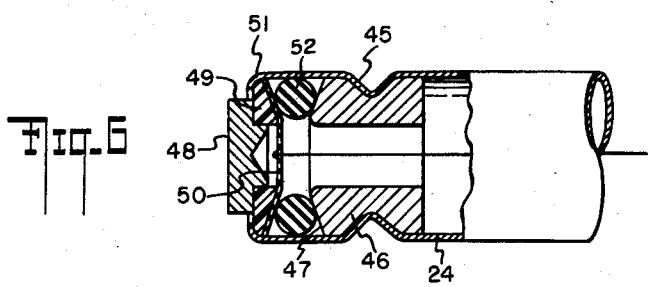
INVENTOR
HUGH BROUGHAM SEDGFIELD
BY
ATTORNEY United States Patent Office 2,944,425
Patented July 12, 1960

2,944,425

GYROSCOPIC APPARATUS

Hugh Brougham Sedgfield, Oakfield, Hampton, England, assignor to The Sperry Gyroscope Company Limited, Brentford, England, a company of Great Britain Filed Dec. 19, 1956, Ser. No. 629,419

Claims priority, application Great Britain Jan. 4, 1956

8 Claims. (Cl. 74—5)

This invention relates to electrically driven or electrically controlled gyroscopes.

One of the problems that arises in electrically driven or electrically controlled gyroscopes is that it is necessary to take one or more electrical connections to a sensitive element. The usual method of doing this is to use slip rings, but these introduce friction. An alternative method frequently used when the sensitive element is supported with limited freedom of angular movement in a follow-up member is to employ flexible wire or ligament connections inter-connecting the sensitive element and the follow-up supporting member, and to use these flexible connections as the current-carrying conductors. However, the flexible connections always exercise some torque between the sensitive element and the follow-up member, which operates to disturb the sensitive element. An important problem, therefore, is how to design these flexible connections so that they exercise the minimum disturbing torque on the sensitive element.

One method that has been proposed where the sensitive element is mounted about a pivot axis in a follow-up element is to use, as the flexible connection, a thin straight wire running in a direction normal to the pivot axis and connected to the sensitive element at a point on the pivot axis, or near to the pivot axis. An extension of this method has been disclosed in copending U.S. application Serial No. 147,144, filed March 3, 1950, for gyroscopic apparatus. In the gyroscope of that application the sensitive element is mounted with angular freedom relative to the follow-up support about two mutually perpendicular pivot axes intersecting at a pivot centre. The identified application further teaches the use of flexible electrical conductors directly inter-connecting the follow-up member and the sensitive element, these conductors being in the form of straight wires running in a direction normal to both pivot axes and connected to the sensitive element at or near the pivot centre. In the gyroscope illustrated in the specification of the heretofore identified application the pivot centre was at the centre of a hollow tube serving as a fixed shaft about which the rotor turned, and the electrical connections passed axially down this hollow tube.

In the previous proposals of the kind discussed, the flexible conducting wire or ligament, at its point of attachment to the sensitive element, has been clamped to a fixed part of the sensitive element. On the occurrence of any relative inclination between the sensitive element and the follow-up member a slight bend then necessarily occurred in the conductor. Owing to the stiffness of the conductor this bend entailed the application of a small torque between the sensitive element and the follow-up member. No matter how compliant the conductors were made this disturbing torque was undesirably large for accurate gyroscopes.

This difficulty has been overcome to some extent in the proposals described in the specification of co-pending U.S. application Serial No. 604,519, filed August 16, 1956, for gyroscopic apparatus, now Patent No. 2,859,623 in which there is described an improved means for attaching the flexible ligament conductor to the sensitive element at, or in the vicinity of, the pivot axis. According to that proposal the inner end of the ligament is attached to the sensitive element by means of a flexible support means to which the inner end of the primary ligament is rigidly fixed and which locates the point of attachment of the primary ligament to the support means with respect to the sensitive element in such a manner as to prevent displacement in a direction normal to the length of the conductor and to the pivot axis but to permit readily angular displacement of the anchorage relative to the sensitive element about an axis parallel to the pivot axis. In this proposal the flexible support means may consist of one or more secondary flexible conducting ligaments, or a very thin conducting diaphragm, normal to the length of the primary conducting ligament, the, or each of the, secondary flexible conductors being attached at its extremities to the sensitive element, and at its centre to the primary ligament and serving to convey current to a utilisation circuit in the sensitive element.

If desired a second primary ligament conductor may be provided extending inwards from the supporting member in a direction substantially in line with the direction of the first primary ligament conductor to be attached to the sensitive element by means of a mounting similar to the mounting for the first primary ligament at or in the vicinity of the pivot axis.

In the case where the sensitive element is mounted in a follow-up member with limited degrees of freedom of angular movement about two axes, the secondary flexible conductor, or conductors, for the, or for both primary conductors, prevent displacement of the primary conductor, or conductors, in a plane, or planes, through, or parallel to a plane through, the pivot axis.

The present invention provides a modification or improvement of the proposal made in the identified U.S. application Serial No. 604,519 for conducting current between a sensitive element and a supporting member for the sensitive element.

According to the present invention there is provided gyroscopic apparatus of the kind comprising a sensitive element mounted in a follow-up member with limited degrees of freedom of angular movement about two mutually perpendicular axes relative to the follow-up member, wherein the sensitive element is provided with a bore extending in the direction of the point of intersection of the axes and wherein means is provided for conducting electrical energy between the sensitive element and the follow-up member which means includes a primary flexible conducting ligament extending through the bore along a line of action passing through the point of intersection of the axes from a point of attachment on the follow-up member to a point of attachment at the centre of a flexible diaphragm or membrane located within the bore in the vicinity of the point of intersection of the axes, the diaphragm extending across the mouth of and being sealed on to a container, such as a cup-shaped element having its line of symmetry parallel to the line of symmetry of the bore, which is secured within the bore and is completely filled with a conducting liquid, the inner end of the primary ligament penetrating through the diaphragm so as to make electrical contact with the conducting liquid within the container, means to ensure that the liquid is insulated from the sensitive element, and means is provided for electrically inter-connecting the liquid in the container with an electrical lead in the sensitive element, whereby electrical energy may be conveyed from the supporting member through the primary ligament and the liquid in the container to the lead in the sensitive element.

If desired a similar primary conducting ligament may be taken from the supporting member to the sensitive element in a direction that is substantially in line with the direction of the first primary conducting ligament from a diametrically opposed point on the supporting member to a second diaphragm similar to the first diaphragm which extends across the mouth of a second non-conducting container filled with conducting fluid and mounted back to back with the first container in the channel.

Embodiments of the invention will now be described with reference to the accompanying drawings in which:

Fig. 2 is a section through a part of similar gyroscopic apparatus embodying another form of the invention.

Fig. 3 is an enlarged section showing the diaphragms and cup-shaped elements in greater detail, Fig. 4 is an enlarged section through a diaphragm, Fig. 5 is a section through a sub-assembly including a cup-shaped element, a diaphragm and a supporting tube.

Fig. 6 is an enlarged end on view of the unit 40 of Fig. 2.

Figure 1:
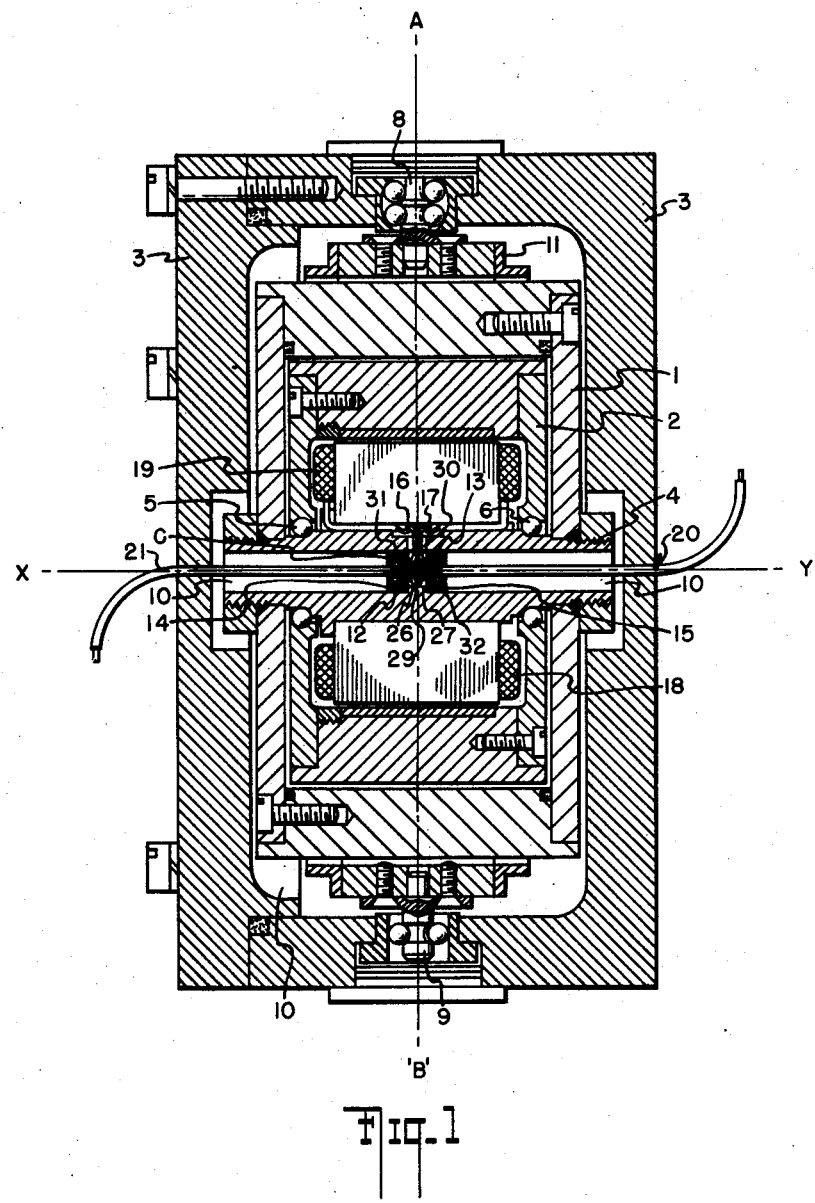
Fig. 1 is a section through a part of gyroscopic apparatus incorporating one form of the invention.

Referring to Fig. 1 which illustrates schematically one embodiment of the invention, the sensitive element comprises a closed rotor case or casing 1 containing a rotor 2 mounted for spinning therein about an axis XY, the rotor case 1 being mounted by means of a gimbal ring 11, in a follow-up member 3 with limited degrees of freedom of angular movement about two mutually perpendicular axes, one of which is AB, and both of which are perpendicular, in normal operation, to the rotor axis XY. Stops (not shown) are provided to limit the relative angular movement that can take place between the sensitive element and the follow-up member. The follow-up member 3 is itself mounted with freedom about two mutually perpendicular axes in a main support (not shown) and is servo-controlled about these axes by means of pick-off devices (not shown) and servo motors (not shown) to follow the angular movements of the rotor case 1 about its axes.

The two pivot axes of the rotor case 1 intersect at a pivot centre C which is located in the centre of a tubular shaft 4 fixed to the rotor case and extending through it in a direction normal to its pivot axes, the rotor 2 of the gyroscope being mounted for spinning about this fixed tubular shaft on bearings 5, 6 so that the rotor also is centred at the pivot centre C of the rotor case 1. The load on the gimbal ring bearings (only the bearings 8, 9 are shown) supporting the rotor case in the follow-up member 3, which is in the form of a sealed container, is taken by mercury 10 completely filling the container, the arrangement being such that the buoyancy forces acting on the rotor case assembly and gimbal ring are sufficient to support the weight of the rotor case assembly and gimbal ring.

The invention is realised in this form of apparatus by mounting two open-mouthed cup-shaped elements 12, 13 back to back at the centre of the tubular shaft with their mouths directed in opposite directions along the axis XY of the shaft. Each cup-shaped element is filled with mercury and sealed by a circular thin flexible non-conducting diaphragm or membrane 14, 15 made of rubber or nylon, for example, extending across its mouth. Leads 16, 17 from windings 18, 19 inside the rotor case are connected to two leaf spring conductors separated by an insulating disc 29 and supported in the shaft 4 by means of a plug 30 made of a material known under the trade name Araldite. The leaf spring conductors 26, 27 respectively make contact with the mercury in cups 12, 13 through the intermediary of metal plates 31, 32 having conducting spigots penetrating through the bottom of the cups, the plates being cemented to the cups. The windings 18, 19 form part of the motor for driving the rotor. Two electrical connections 20, 21 are taken to the mercury in the cup-shaped elements by two insulated straight wires extending in opposed directions from points of attachment on the follow-up member towards the pivot centre C in a direction along the axis of the tubular shaft, that is, in a direction normal to the intersecting pivot axes for the rotor case. The wires 20, 21 penetrate centrally into the centres of the flexible diaphragms 14, 15 across the mouths of the cup-shaped elements. The exposed lengths of the conducting wires lying outside the mercury in the cup-shaped elements, that is, lying within the supporting mercury, are coated with an insulating varnish so that the wires are insulated from the supporting mercury 10 in which the rotor case is floated. The insulating varnish is removed from the extreme tips of the wires that penetrate through the diaphragms, so that they can make electrical contact with the mercury in the cup-shaped elements. Preferably the tips of the wires are conically pointed. The cup-shaped part and the diaphragm part of the described components interfit to provide a closed receptacle for the conducting fluid contained therein.

If the rotor driving the motor is a three phase motor the third leg may be constituted by the rotor case, the mercury supporting the rotor case and the supporting member.

A preferred form of the invention is shown in detail in Figures 2 to 5. Referring to Fig. 2, the sensitive element comprises a rotor case 1, containing the rotor 2, which is mounted for spinning therein about the axis XY. The rotor case assembly is mounted by means of a gimbal ring in a follow-up member in a manner similar to that of Fig. 1, but the gimbal ring and follow-up member are not shown for ease of illustration and description. Stops (not shown) are provided to limit the extent of relative angular movement between the sensitive element and the follow-up member. As in Fig. 1, the rotor 2 is mounted for spinning on bearings 5, 6, the inner races of which are carried by a tubular shaft to which the rotor case is also fixed. In order to reduce the load on the bearings the weight of the rotor case assembly and gimbal ring is taken, in the present case, by mercury completely filling the follow-up member, which is in the form of a sealed container and the tubular shaft 4, being connected to the interior of the follow-up member, is therefore filled with the mercury. Suitable seals 22 and 23 are provided for preventing mercury from seeping into the interior of the rotor case.

The primary conducting ligament 20′, the diaphragm 15′, the mercury cup 13′, a nickel tube 24 carrying the cup and the diaphragm, and a metal flange 25, are assembled as a unitary structure, the structure being mounted on the rotor case in such a manner that the tube 24 is located within the tubular shaft 4 and is a close fit within the shaft with its axis of symmetry along the axis XY. The flange is secured to one end plate of the rotor case by four screws, two of which 26, 27 are shown. A seal 28 prevents mercury from seeping between the tube 24 and the interior of the hollow shaft 4.

Similarly the primary conducting ligament 21′, the diaphragm 14′, the mercury cup 12′, a nickel tube 29 carrying the cup and the diaphragm, and a metal flange 30 are assembled as a unitary structure, the structure being mounted on the rotor case in such a manner that the tube 29 is located within the tubular shaft 4 and is a close fit within the shaft with its axis of symmetry along the axis XY. The flange is secured to the opposite end plate of the rotor case by four screws, two of which 31, 32 are shown. A seal 33 prevents mercury from seeping between the tube 29 and the interior of the hollow shaft 4. Each of the conducting ligaments 20′, 21′ has a density equal to that of mercury so that its weight is just supported by the mercury.

Each of the diaphragms 14′, 15′ is made as a deep moulding from insulating material, such as known under the trade name Terylene, of between .010″ and .015″ thickness to form a cup-shaped element having a diametrical cross section as shown in Fig. 4, so that a cylindrically-shaped space is provided between the inner and outer walls 34, 35. Each diaphragm also has a circular lip 36. The bottom of the cup 47 forms the diaphragm proper. When assembled, as shown in Figs. 2 and 3, each diaphragm lies within its mating tube with the outer surface of the wall 35 cemented to the inner surface of the tube and the rim of the cup abutting against and cemented to the end of the tube. In this embodiment, each of the nickel cups 12', 13' is filled with mercury and is mounted, in the manner shown in Figs. 2 and 3, with the wall of the cup located within the cylindrical space defined by the walls 34, 35 of the diaphragms 14', 15'. The outer and inner faces of the wall of the mercury holding cup are cemented to the outer wall (35) of the diaphragm by means of a suitable adhesive cement.

Each of the primary conducting elements 20', 21' is made of platinum and is coated with an insulating varnish, so as to insulate the lengths of the wire that lie within the mercury in the shaft 4, from the mercury. The insulating varnish is removed from the extreme tips of the ligaments, and the ligaments are made to penetrate the diaphragms substantially at their centres until the bare tips are within the mercury in the cup-shaped elements and thus make electrical contact with the mercury. Preferably platinum beads 37, 38 are provided on the tips of the wires to prevent the wires from being easily pulled out of the diaphragm and to provide better contacts. Each wire is suitably attached to its diaphragm by a cement in such a manner that no connection is made between the mercury within the cup and the mercury in the shaft 4 and when connected to the follow-up member the wire is just taut with no tension.

Located between the two faces of the two mercury-holding cups 12', 13' is a unit 39 which comprises two beryllium copper strips 40, 41 separated by a circular mica spacer 42. The shapes of the beryllium copper strip and the mica spacer are more clearly shown in Fig. 5. The two strips and the mica spacer are held together by a plug, made of the material of plug 30, which is suitably cemented within a compartment in the shaft 4. The two ends of the strips outside the hollow shaft are bent in opposite directions parallel to the length of the shaft and are connected at 43 and 44 to the two ends of conducting ligaments 45', 46' whose other ends are connected to the windings of the electric motor which drives the rotor.

The two strips are bowed, as shown, so that each becomes a light leaf spring, the bottom ends being free to ride on the mica strip when the leaf spring strip is compressed. The two unitary structures that are inserted into the hollow shaft 4 are so dimensioned that, when located by means of the fastening screws the two conducting nickel cups 12', 13' engage the beryllium copper strips 40, 41, which act as spring contacts maintaining contact, on the one hand, between the lead 20' and the lead 45', through the mercury in cup 13', the cup itself, and the beryllium copper strip 40, and, on the other hand, between the lead 21' and the lead 46', through the mercury in cup 12', the cup itself, and the beryllium copper strip 41. The ends of the leads 20', 21' attached to the follow-up member may be connected to a suitable source of energy for driving the rotors.

It will be appreciated that, with the embodiment illustrated, the occurrence of relative inclination of the sensitive element and its supporting follow-up member about any axis the slight bending of the primary conductors 20', 21' will, due to the presence of the very flexible diaphragm 14', 15' reduce the torque that would otherwise be applied in the absence of the diaphragm by an order of magnitude.

A modified form of locating the diaphragm over the mouth of the cup of the embodiment of Fig. 2 is illustrated in Fig. 6.

As shown in Fig. 6, the thin walled nickel tube 24 is crimped circumferentially at a location 45 into a channel in a cylindrical stainless steel ring 46, the stainless steel ring having its inner face 47 inclined as shown. A steel piece 48, plated with a conducting material which does not react with mercury, has a Bakelite washer 49 cemented to it to provide an electrically conductive cup-shaped part. With an insulative diaphragm part 50 placed in position over the Bakelite washer, the whole assembly is inserted into the nickel tube to compress a neoprene O-ring 52 against the inclined surface 47 of the cylindrical ring 46. The assembly is held in position by the turned-in edge 51 of the nickel tube 24 with the neoprene O-ring distorted and under compression sufficiently to seal the interior of the piece 48 from the interior of the nickel tube 24. The cup-shaped part of the assembly is subsequently filled with mercury through a filling hole, not shown, preferably under vacuum.

I claim:

1. The combination in a gyroscopic apparatus having a closed rotor casing with a bore extending along the rotor axis and a radial opening at the center of the bore and a follow-up member on which the casing is universally supported; of a closed receptacle containing an electrically conductive fluid therein having interfitting electrically conductive cup-shaped and electrically insulative diaphragm parts with a peripheral electrically insulative portion fitting the bore in juxtaposed relation to the radial opening in the casing, an electrically conductive ligament extending along the bore attached to the member and connected to the diaphragm in contacting relation to the fluid in the receptacle, and an electrically conductive spring member in said casing extending through the opening therein to contact the conductive cup-shaped part of the receptacle.

2. The combination in a gyroscopic apparatus having a closed rotor casing with a bore extending along the rotor axis and a radial opening at the center of the bore, and a follow-up member on which the casing is universally supported; of a pair of closed receptacles containing an electrically conductive fluid therein having interfitting electrically conductive cup-shaped and electrically insulative diaphragm parts, said receptacles being arranged in the casing in juxtaposed back-to-back relation on opposite sides of the radial opening and having peripheral insulative portions fitting the bore, an electrically conductive ligament extending along the bore attached to the member and connected to each of the diaphragms in contacting relation to the fluid in the receptacles, and an electrically conductive spring member in said casing for each of the receptacles extending through the opening therein in insulated relation to contact the respective conductive cup-shaped parts of the receptacles.

3. The combination in a gyroscopic apparatus having a rotor casing with a bore extending along the rotor axis and a radial opening at the center of the bore, and a follow-up member on which the casing is universally supported; of a tube fitting the bore connected to the casing with an internal end arranged in juxtaposed relation to the radial opening, a closed receptacle containing an electrically conductive fluid therein having interfitting electrically conductive cup-shaped and electrically insulative diaphragm parts fitting the internal end of the tube, an electrically conductive ligament extending along the tube attached to the member and connected to the diaphragm in contacting relation to the fluid in the receptacle, and an electrically conductive spring member in said casing extending through the opening therein to contact the conductive cup-shaped part of the receptacle.

4. The combination in a gyroscopic apparatus having a rotor casing with a bore extending along the rotor axis and a radial opening at the center of the bore, and a follow-up member on which the casing is universally supported; of a pair of tubes fitting the bore and arranged in connected relation to the casing on opposite sides of the radial opening, a pair of closed receptacles containing an electrically conductive fluid therein fitting the internal ends of the respective tubes and arranged in back-to-back relation having interfitting electrically conductive cup-shaped and electrically insulative diaphragm parts, an electrically conductive ligament extending along each tube attached to the member and connected to each of the diaphragms in contacting relation to the fluid in the receptacles, and an electrically conductive spring member in said casing for each of the receptacles extending through the opening therein in insulated relation to contact the respective conductive cup-shaped parts of the receptacle.

5. The combination in a gyroscopic apparatus with a follow-up frame, a closed rotor casing universally supported on the frame having a bore extending along the rotor axis and a radial opening at the center of the bore; of a closed receptacle containing an electrically conducting fluid therein having interfitting electricaly conductive cup-shaped and electrically insulative diaphragm parts with a peripheral electrically insulative portion fitting the bore in juxtaposed relation to the radial opening in the casing, an electrically conductive ligament connected to the frame to extend along the bore and connected to the diaphragm in contacting relation to the fluid in the receptacle, and an electrically conductive member contacting the conductive cup-shaped part of the receptacle located at the opening in the casing.

6. The combination in a gyroscopic apparatus with a follow-up frame, a closed rotor casing universally supported on the frame having a bore extending along the rotor axis and a radial opening at the center of the bore; of a pair of closed receptacles containing an electrically conductive fluid therein having interfitting electrically conductive cup-shaped and electrically insulative diaphragm parts, said receptacles being arranged in the casing in juxtaposed back-to-back relation on opposite sides of the radial opening and having peripheral insulative portions fitting the bore, electrically conductive ligaments connected to oppositely disposed parts of the frame to extend along the bore and connected to the respective diaphragms in contacting relation to the fluid in the respective receptacles, and electrically conductive members contacting the conductive cup-shaped parts of the respective receptacles located at the opening in the casing.

7. The combination in a gyroscopic apparatus with a follow-up frame, a closed rotor casing universally supported on the frame having a bore extending along the rotor axis and a radial opening at the center of the bore; of a tube fitting the bore connected to the casing with an internal end arranged in juxtaposed relation to the radial opening, a closed receptacle containing an electrically conductive fluid therein having interfitting electrically conductive cup-shaped and electrically insulative diaphragm parts fitting the internal end of the tube, an electrically conductive ligament connected to the frame to extend along the tube and connected to the diaphragm in contacting relation to the fluid in the receptacle, and an electrically conductive member contacting the conductive cup-shaped part of the receptacle located at the opening in the casing.

8. The combination in a gyroscopic apparatus with a follow-up frame, a closed rotor casing universally supported on the frame having a bore extending along the rotor axis and a radial opening at the center of the bore; of a pair of tubes fitting the bore and arranged in connected relation to the casing on opposite sides of the radial opening, a pair of closed receptacles containing an electrically conductive fluid therein fitting the internal ends of the respective tubes and arranged in back-to-back relation having interfitting electrically conductive cup-shaped and electrically insulative diaphragm parts, electrically conductive ligaments connected to oppositely disposed parts of the frame to extend along the respective tubes and connected to the respective diaphragms in contacting relation to the fluid in the respective receptacles, and electrically conductive members contacting the conductive cup-shaped parts of the respective receptacles located at the opening in the casing.

References Cited in the file of this patent

UNITED STATES PATENTS

| | | |
|---|---|---|
| 1,924,816 | Sperry | Aug. 29, 1933 |
| 2,560,940 | Findley | July 17, 1951 |
| 2,600,476 | Bursach | June 17, 1952 |

FOREIGN PATENTS

| | | |
|---|---|---|
| 983,458 | France | Feb. 14, 1951 |